United States Patent [19]
Carey et al.

[11] 3,760,949
[45] Sept. 25, 1973

[54] SEALING MEANS FOR HOLLOW FIBER BUNDLES

[75] Inventors: Donald F. Carey, Durham; Richard L. Leonard, Cary; Thomas A. Orofino, Durham, all of N.C.

[73] Assignee: The United States of America as represented by the Secretary of the Interior, Washington, D.C.

[22] Filed: Aug. 13, 1971

[21] Appl. No.: 171,431

[52] U.S. Cl. ............................ 210/321, 210/450
[51] Int. Cl. ............................................ B01d 31/00
[58] Field of Search ............... 210/23, 321, 450; 55/16, 158; 264/258

[56] References Cited
UNITED STATES PATENTS

| | | | |
|---|---|---|---|
| 3,422,008 | 1/1969 | McLain | 210/22 |
| 3,503,515 | 3/1970 | Tomsic | 210/321 |
| 3,567,632 | 3/1971 | Richter et al. | 210/500 X |
| 3,498,909 | 3/1970 | Littman | 210/23 |
| 2,583,812 | 1/1952 | Briggs et al. | 210/450 X |
| 2,022,164 | 11/1935 | Sweetland | 210/323 X |
| 3,664,507 | 5/1972 | Jordan | 210/323 |

*Primary Examiner*—Frank A. Spear, Jr.
*Attorney*—Frank A. Lukasik and Watson T. Scott

[57] ABSTRACT

Hollow fiber bundles are sealed within an elongated tubular reverse osmosis module by means of a polymeric elastomer coated onto a fiber bundle at the point of exit of the bundle from the module. The elastomeric seal is in a tapered configuration with the narrowest point being at the open end of the module. The interior of the open end of the module contains a rigid insert shaped to mate the tapered bundle end. The sealing means described provides for fluid tight seals during operation of the module at relatively high pressures. There may also be provided a porous plate firmly held against the ends of the fibers at the open end of the module which aids in retaining the fiber bundle in the module during operation.

6 Claims, 1 Drawing Figure

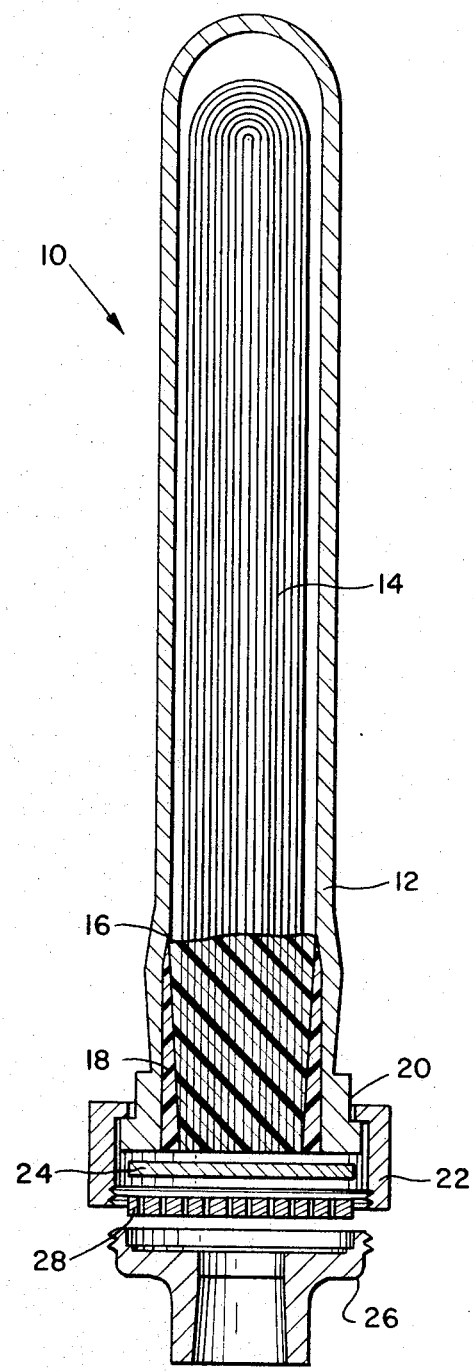
INVENTORS
DONALD F CAREY
RICHARD L. LEONARD
THOMAS A OROFINO

SEALING MEANS FOR HOLLOW FIBER BUNDLES

BACKGROUND OF THE INVENTION

This invention relates to an apparatus for purifying liquids by means of reverse osmosis with hollow fibers. More particularly, this invention relates to a method of providing a seal to retain the hollow bundle in a reverse osmosis module.

Long thin permeable hollow fibers prepared from organic polymers are found to be useful in permeation separation apparatus by employing the propensity of the fiber to pass one fluid through the fiber walls more easily than other fluids, ions, or ingredients. For example, U.S. Pat. No. 3,228,877 discloses such an apparatus composed of a cylindrical jacket containing a plurality of small diameter selectively permeable hollow fibers. The fibers extend longitudinally the length of the jacket and through each capped end of the cylinder. The fluid feed mixture is admitted under pressure to the jacket interior where the componenet desired to be separated passes through the walls of the hollow fibers, and the interior of the hollow fibers into a collecting vessel. The remainder of the fluid mixture still inside the jacket is drawn off through an outlet port.

Another type of permeable separation device which utilizes selectively permeable hollow fibers is described in British Pat. No. 1,019,881. This device operates in the same manner as described above but the configuration of the fibers within the jacket is different. The hollow fibers do not extend the length of the cylinder but, the fibers extend into the cylinder and are then doubled or looped back the length of this cylinder again so that both ends of the hollow fiber are merged from the same end of the cylindrical jacket. In other words, the hollow fibers form a U inside the jacket with the bottom or loop portion of the fiber at one end of the cylinder and the two ends of the fiber merging from the other end.

It is necessary, of course, in all such hollow fiber separation apparatus that a seal be provided in the ends of the cylinder to prevent liquid from escaping from the cylinder rather than through the interior of the hollow fibers. Prior to this time, the method for forming the seal, which is required to hold under the high pressure of the operation of the cylinder, involved applying a sealant and separating the seal end of the hollow fiber bundle from the active end, that is, that portion of the bundle which is used to separate the constituents from the water, by means of a secondary seal applied during the preparation of the fiber for insertion into the module. After the secondary seal is applied, the active portion of the fiber had to be immobilized in water and the seal end was treated with heat to stabilize the outer fiber diameter. After this operation, the seal end was dried and a rigid epoxy seal was applied to form the functional bundle within the cylindrical module.

SUMMARY OF THE INVENTION

Accordingly it is an object of this invention to provide a means for sealing hollow fiber bundles within fluid separation apparatus.

Another object of this invention is to provide means for sealing hollow fiber bundles which will withstand the high pressure of operation of a reverse osmosis apparatus.

It is a still further object of this invention to provide a means for sealing hollow fiber bundles within reverse osmosis apparatus which means is simple, economic and efficient.

Briefly in accordance with this invention there is provided an apparatus for purifying liquids by means of reverse osmosis comprsiing an elonaged module containing a plurality of hollow filaments, wherein the filaments are bonded together by means of an elastomeric sealant surrounding the bundle at a point proximate to an open end of the module and wherein the sealant coating is provided in the form of a tapered plug with its narrowest point being proximate to the open end of the module.

There may also be provided a porous plate firmly attached to the open end of the module which serves to absorb the thrust of the high operating pressure and retain the hollow fiber bundle within the module during operation.

BRIEF DESCRIPTION OF THE DRAWINGS

In the drawings the FIGURE is a cross-sectional view of the apparatus of this invention and illustrates tapered sealing means 16 retaining a bundle of hollow fibers 14 within a module 10.

DETAILED DESCRIPTION OF THE INVENTION

The invention will be more fully understood with reference to the accompanying drawing wherein module 10 comprises an elongated jacket 12 open at one end and containing a bundle of hollow fibers 14 in the shape of a U with both ends of the fiber exiting at the open end of the module. The ends of the hollow fiber bundle are sealed by means of an elastomeric sealant 16 which is shaped in the form of a taper having an angle inclined outwardly into the module. Surrounding the sealed fiber bundle is a rigid cone-shaped housing 18 adapted to mate with the tapered sealant 16 and retain bundle 14 within the module during operation. The open end of the module 10 is equipped with flange 20 for receiving female coupling means 22. Porous plate 24 is placed at the open end of the fiber bundle and held into place by means of male coupling means 26. If desired, a backing plate 28 having a plurality of openings therein to permit the passage of water may be inserted beneath porous plate 24.

To form the seal on the fiber bundle in accordance with the present invention, an elastomeric sealant is applied to to fiber bundle which, prior to its insertion into the reverse osmosis module, is generally in the shape of an elongated O, that is, there are not cut ends on the bundle. The sealant is applied to the bundle near the end thereof, molded in the desired shape, i.e., a taper, and thereafter cured. The bundle is then inserted into the module after which the mated reverse taper element 18 is forced into the module with slight pressure. After the hollow fiber bundle is located within the module, a slight pressure is applied to the interior of the module which causes a slight displacement of hollow fibers allowing for the severing of the ends which extend beyond the open end of the module. Porous plate 24 and, if desired, backing plate 28 are then installed by means of coupling members 22 and 26.

Suitable materials for use as sealants in accordance with the present invention are polymeric elastomers which have sufficiently low viscosity to coat the fibers and which cure to a higher viscosity after being formed. Typical materials are natural and synthetic rubber, urethanes, polysulfides, and silicones. The preferred sealants are silicone rubbers. These materials have good stability and will cure in the presence of water. Suitable silicone rubbers are Sylgard 182, 184 and 186 (Dow Corning Company) and RTV-11, -21 and -88 (General Electric Company).

The material employed in the fabrication of the interior housing 18 should be a rigid material which will allow for a fluid tight seal. Epoxy resins have been found particularly useful for this purpose although other resins such as polystyrene, polyvinyl chloride and the like may be employed.

In operation of the apparatus of this invention, a contaminated liquid e.g., brackish water, is fed to the interior of module 10 through a pressurized entrance means (not shown). The hollow fibers within the module, being composed of a material which will allow permeation of water into the interior thereof, act as a separating means with the clear, purified water exiting the module at the open ends of the fiber bundle. The module is also provided with means (not shown) for removing effluent impure liquid. The pressure within the module develops a lateral compressive force which seals the fiber to the sealant innerface against leakage. The porous retainer plate absorbs the thrust load of the high operating pressure of the module. It has been found that the modules sealed in the manner described may be continuously operated at pressures up to 250 psi and higher without leakage of untreated water.

Polymeric materials suitable for fabrication of the hollow fibers are known in the art and include polyethylene terephthalate, polyvinyl chloride, polyvinylidene chloride, polyhexamethalene adipamide, copolymers of tetrafluoroethylene and hexafluoropropylene, cellulose acetate, ethyl cellulose, polystyrene, copolymers of butadiene and styrene, cellulose esters, cellulose ethers, acrylonitriles, polyvinyl formals and butyrals, polyoelfins, polyurethanes, polyamides, and the like. Cellulsoe acetate is the preferred material.

The porous plate 24 used to retain the fiber bundle within the module under the thrust of the high operating pressures therein may likewise be made of any suitable material, that is, any material which will not allow leakage or permit the fiber ends to be ejected from the module. A particularly suitable material for the fabrication of the porous plate 24 has been found to be a small gauge heavy stainless steel mesh.

The particular design of the taper seal 16 will depend on the amount of pressure within the module. It has been found that taper angle between about 5° and 10° are generally adequaate for the purposes of this invention, with a taper angle of 7½° being preferred.

The foregoing detailed description has been given for clearness and understanding only and no unnecessary limitations are to be understood therefrom. The invention is not limited to the exact details shown and described as obvious modifications will occur to those skilled in the art.

What is claimed is:

1. In an apparatus for purifying liquids by means of reverse osmosis comprising an elonagted module containing a plurality of hollow filaments, wherein the filaments are bonded together by means of an elastomeric sealant surrounding the bundle at a point proximate to an open end of the module, the improvement which comprises providing: (1) an elastomeric sealant surrounding the bundle in the form of a tapered plug with its narrowest point being proximate the open end of the module, and (2) a mated reverse taper element inserted into said module.

2. The apparatus as defined in claim 1, comprising further a porous plate secured against the open end of the module.

3. The apparatus as defined in claim 2, when the porous plate is composed of a fine gauge stainless steel mesh material.

4. The apparatus as defined in claim 1, wherein the elastomeric sealant is silicone rubber.

5. The apparatus as defined in claim 1, wherein the hollow filaments are composed of cellulose acetate.

6. An apparatus comprising a pressure vessel having a conically shaped opening with the smaller diameter of said opening at the exterior of said pressure vessel,
- a plurality of hollow filaments residing in said pressure vessel with the ends thereof extending through said opening.
- an elastomeric sealant surrounding and separating said filaments along the lengths of said filaments proximate said opening
- in a trun-cated cone-shaped form, being received by and residing in said conically shaped opening,
- a reverse taper element mated to said elastomeric sealant,
- whereby said filaments are secured in said opening and pressure sealing said vessel.

* * * * *